United States Patent
Wallestad et al.

(10) Patent No.: US 10,462,971 B2
(45) Date of Patent: Nov. 5, 2019

(54) HYDRAULIC COTTON UNIT DRUM DRIVE

(71) Applicant: Deere & Company, Moline, IL (US)

(72) Inventors: Steven D. Wallestad, Ankeny, IA (US);
James T. Noonan, Bondurant, IA (US);
Charles F. Ostermeier, Slater, IA (US)

(73) Assignee: DEERE & COMPANY, Moline, IL (US)

( * ) Notice: Subject to any disclaimer, the term of this patent is extended or adjusted under 35 U.S.C. 154(b) by 144 days.

(21) Appl. No.: 15/689,320

(22) Filed: Aug. 29, 2017

(65) Prior Publication Data

US 2019/0059225 A1    Feb. 28, 2019

(51) Int. Cl.
*A01D 46/08*    (2006.01)

(52) U.S. Cl.
CPC .................................. *A01D 46/085* (2013.01)

(58) Field of Classification Search
CPC .... A01D 46/085; A01D 46/081; A01D 46/16; A01D 46/08; A01D 46/14; A01D 46/18; A01D 69/02; A01D 69/025; A01D 69/03

USPC .... 56/10.2 R, 10.9, 11.2, 28, 30, 41, 44, 48, 56/49

See application file for complete search history.

(56) References Cited

U.S. PATENT DOCUMENTS

| | | |
|---|---|---|
| 3,999,359 A | 12/1976 | Jordan et al. |
| 4,896,491 A | 1/1990 | Warnsholz et al. |
| 5,191,753 A * | 3/1993 | Fachini .................. A01D 46/08 56/10.9 |
| 5,325,656 A | 7/1994 | Schreiner et al. |
| 8,006,472 B1 * | 8/2011 | Schreiner ............... A01D 46/16 56/49 |
| 10,219,436 B2 * | 3/2019 | Goering ................ A01D 46/085 |
| 2008/0046154 A1 * | 2/2008 | Bares ................... A01D 46/085 701/50 |

* cited by examiner

*Primary Examiner* — Robert E Pezzuto
(74) *Attorney, Agent, or Firm* — Taft Stettinius & Hollister LLP; Stephen F. Rost (57) ABSTRACT

A cotton harvester with a hydraulic manifold and at least one hydraulic motor mechanically coupled to a drum and fluidly coupled to the hydraulic manifold, the hydraulic motor configured to selectively rotate the drum. Wherein, the hydraulic manifold is configured to selectively provide any one of a braking force and a torque to the drum through the at least one hydraulic motor.

20 Claims, 9 Drawing Sheets

HYDRAULIC COTTON UNIT DRUM DRIVE

FIELD OF THE DISCLOSURE

The present disclosure relates to a hydraulic control system, and in particular, to a hydraulic control system that modifies a drum speed of a cotton harvester.

BACKGROUND OF THE DISCLOSURE

Cotton harvesters with row units include a number of picking units for harvesting cotton. Each picking unit includes at least one drum, and on some units there may be a front drum and a rear drum. In any event, on each drum there is a number of picker bars and on each picker bar there are a plurality of spindles. Each spindle can be tapered and have a barbed surface for removing the cotton from the cotton plant. Each row unit includes a doffer column having a plurality of doffers for removing picked cotton from the spindles. A doffer is a disc that may be coated in rubber or urethane and rotatably driven at a velocity greater than that of the spindles. In a conventional cotton harvester row unit, the spindles move underneath the bottom face of the doffers so that the cotton is unwrapped and stripped from the spindles.

In a conventional cotton picker row unit, there is a single gearbox input for rotatably driving all of the components of the row unit (i.e., the drum, spindles and doffers). During operation, drum speed is synchronized with the ground speed of the machine such that as the machine speed increases, the drum speed increases and vice versa. In many applications, the relationship between ground speed and drum speed is linear. Speed sensors and the like detect or measure ground speed of the machine, and the single gearbox input is controlled accordingly so that drum speed is synchronized to the ground speed. In doing so, the drum rotates when the machine is moving, and the drum is held from rotating when the machine is idle. Likewise, as the drum is rotatably driven, the spindles and doffers are also driven in a similar manner.

SUMMARY

One embodiment is a cotton harvester with a hydraulic manifold and at least one hydraulic motor mechanically coupled to a drum and fluidly coupled to the hydraulic manifold, the hydraulic motor configured to selectively rotate the drum. Wherein, the hydraulic manifold is configured to selectively provide any one of a braking force and a torque to the drum through the at least one hydraulic motor.

In one example, the at least one hydraulic motor is more than one hydraulic motor fluidly coupled to the hydraulic manifold in a series configuration.

In another example, the hydraulic manifold comprises a reversing valve to selectively reverse a rotation direction of the drum with the hydraulic motor.

In yet another example, the hydraulic manifold has a proportional valve to selectively control the rotational speed of the hydraulic motor both when the hydraulic motor is providing a braking force on the drum and when the hydraulic motor is providing a torque on the drum.

Another example of the above embodiment includes a hydraulic pump providing hydraulic fluid to the hydraulic manifold at a system pressure, an oil return line fluidly coupled to the hydraulic manifold to return hydraulic fluid to a source, and a boost valve fluidly coupled to the hydraulic manifold and having a first position and a second position. Wherein, when the boost valve is in the first position, the boost valve provides a fluid path through the boost valve between the hydraulic pump and the oil return line. Further wherein, when the boost valve is in the second position, the boost valve does not provide a fluid path through the boost valve between the hydraulic pump and the oil return line. In one aspect of this example a controller sends a signal to the boost valve to position the boost valve in either the first position or the second position.

In yet another example, the position of the boost valve is determined mechanically based on a return line pressure.

In one example, the at least one hydraulic motor has an inlet port and an outlet port and a relief valve configured to selectively fluidly couple the inlet port to the outlet port. Wherein, the relief valve bypasses the at least one hydraulic motor by fluidly coupling the inlet port to the outlet port when a fluid pressure at one of the inlet port or the outlet port is greater than a pressure threshold.

Another embodiment is a hydraulic system for a row unit on a cotton harvester with a pump providing a hydraulic fluid at a system pressure and having an oil return line, a hydraulic manifold fluidly coupled to the pump and the oil return line, a first hydraulic motor coupled to a first drum assembly, the first hydraulic motor fluidly coupled to the hydraulic manifold, and a second hydraulic motor coupled to a second drum assembly, the second hydraulic motor fluidly coupled to the hydraulic manifold. Wherein the first and second hydraulic motors are fluidly coupled to the hydraulic manifold in series. Further wherein, the hydraulic manifold is configured to rotate the first and second drum assemblies in a first direction and a second direction.

In one example of this embodiment, the hydraulic manifold has a proportional valve that selectively alters the rotational speed of the first and second drum assembly. In one aspect of this example, the proportional valve selectively varies the rotational speed of the first and second drum assembly based on a ground speed of the cotton harvester.

Another example includes a reversing valve in the hydraulic manifold having a first position and a second position. Wherein, when the reversing valve is in the first position, the first and second drum assembly rotate in the first direction. Further wherein, when the reversing valve is in the second position, the first and second drum assembly rotate in the second direction. In another aspect of this example, a user input transitions the reversing valve between the first position and the second position.

In yet another example, the hydraulic manifold further includes a boost valve having a first position and a second position. Wherein, when the boost valve is in the first position, the pump is fluidly coupled to the oil return line through the boost valve. Further wherein, when the boost valve is in the second position, the pump is fluidly isolated from the oil return line through the boost valve and hydraulic fluid is routed through the first and second hydraulic motor at the system pressure.

In yet another embodiment, a cotton harvester system has a cotton harvester having a prime mover and a drive system, a harvesting system having a first side and a second side, a first hydraulic manifold fluidly coupled to a first hydraulic motor, the first hydraulic motor configured to rotate a first drum positioned on the first side, and a second hydraulic manifold fluidly coupled to a second hydraulic motor, the second hydraulic motor configured to rotate a second drum positioned on the second side. Wherein, the first hydraulic motor and the second hydraulic motor are configured to selectively rotate the corresponding first and second drums at different speeds relative to one another.

One example of this embodiment includes a first proportional valve in the first hydraulic manifold, and a second proportional valve in the second hydraulic manifold. Wherein the first proportional valve is configured to alter the rotational speed of the first hydraulic motor and the second proportional valve is configured to alter the rotational speed of the second hydraulic motor.

Another example includes a first in-line hydraulic motor fluidly coupled to the first hydraulic manifold in series with the first hydraulic motor, and a second in-line hydraulic motor fluidly coupled to the second hydraulic manifold in series with the second hydraulic motor.

In one example, the first hydraulic manifold has a first reversing valve configured to selectively rotate the first hydraulic motor in a first direction or a second direction and the second hydraulic manifold has a second reversing valve configured to selectively rotate the second hydraulic motor in the first direction or the second direction. Further wherein, the position of the first reversing valve is controlled independently of the position of the second reversing valve.

In yet another example the drive system provides an input to the first and second hydraulic manifold during a turn condition. Further wherein, the first hydraulic manifold is configured to rotate the first hydraulic motor at a different speed than the second hydraulic motor during the turn condition.

In one example the cotton harvester further has a pump providing hydraulic fluid at a system pressure to each of the first and second hydraulic manifolds.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
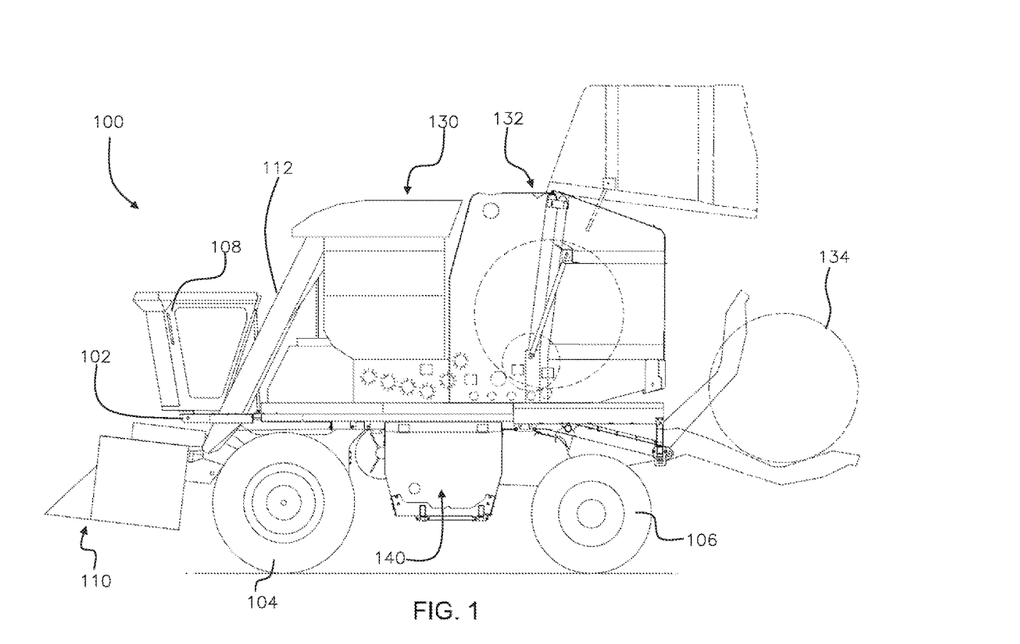
FIG. 1 is a side view of a cotton harvester.

Referring now to FIG. 1, one embodiment of a cotton harvester 100 is shown having a main frame 102 supported for movement by forward drive wheels 104 and rear steerable wheels 106. An operator station or cab 108 is supported at the front end of the main frame 102 above forwardly mounted cotton harvesting units 110 which removes cotton from plants and directs the removed cotton into an air duct system 112.

An accumulator system 130 is shown coupled to the frame 102 behind the cab 108 for receiving the cotton from the air duct system 112. The accumulator system 130 stores cotton as necessary, and a metering floor uniformly distributes the cotton to a module builder 132 which first forms a compressed mat of material and then rolls the mat into a compact bale or module 134.

While the cotton harvester 100 may have several motors and drive systems for powering sub-assemblies as described in more detail below, a prime mover 140 is the primary source of power to the sub-assemblies. More specifically, in one embodiment, the prime mover 140 may be a diesel or gas engine. The prime mover 140 may provide power to a ground drive, cotton fan, engine fan, hydraulic pump, and a cotton feeding system to name a few sub-assemblies. Further, the sub-assemblies may be powered through a hydraulic pump, electric generator, and/or mechanical drivetrain to name a few of the drive systems for the sub-assemblies driven by the prime mover 140.

While diesel and gas engines are described herein for the prime mover 140, other types of engines and drive systems are also considered. In one example, the prime mover may be a turbine engine. In another example, the prime mover may be an electric motor. In yet another example, the prime mover may by a hybrid combination of the diesel, gas, or turbine engine along with an electric generator and motor. Accordingly, many different types of prime movers 140 are considered herein, and no single type should be limiting.

This disclosure is not limited to the particular cotton harvester 100 shown in FIG. 1 and described above. Rather, this disclosure applies to any cotton harvester that utilizes drums to harvest cotton and the cotton harvester 100 is only used as one example of such an application.

Figure 2:
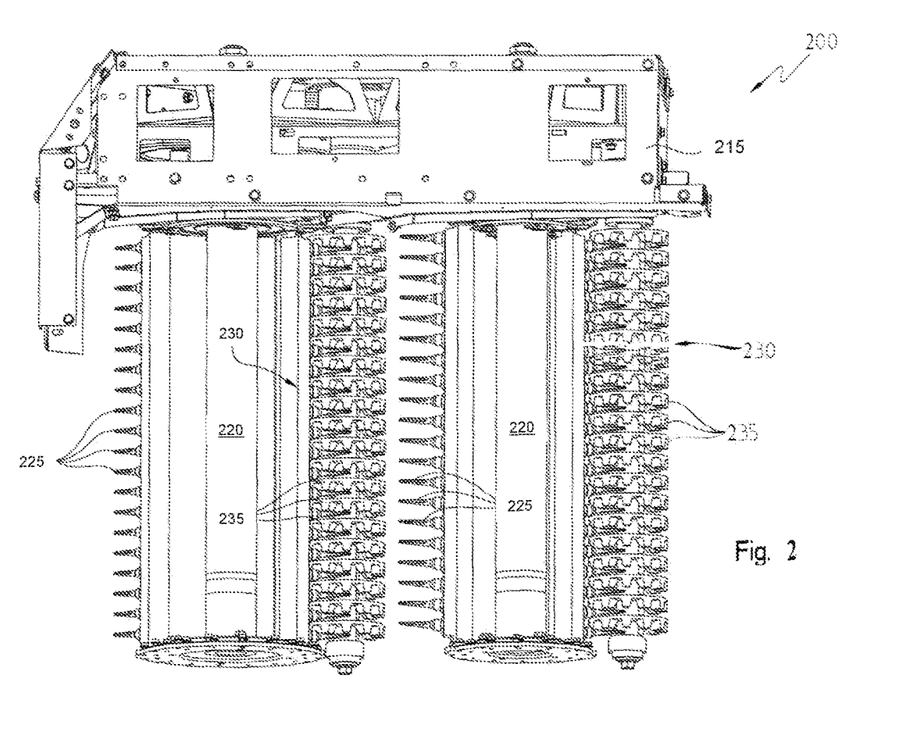
FIG. 2 is a side sectional view of a portion of a cotton picker row unit.
Figure 5:
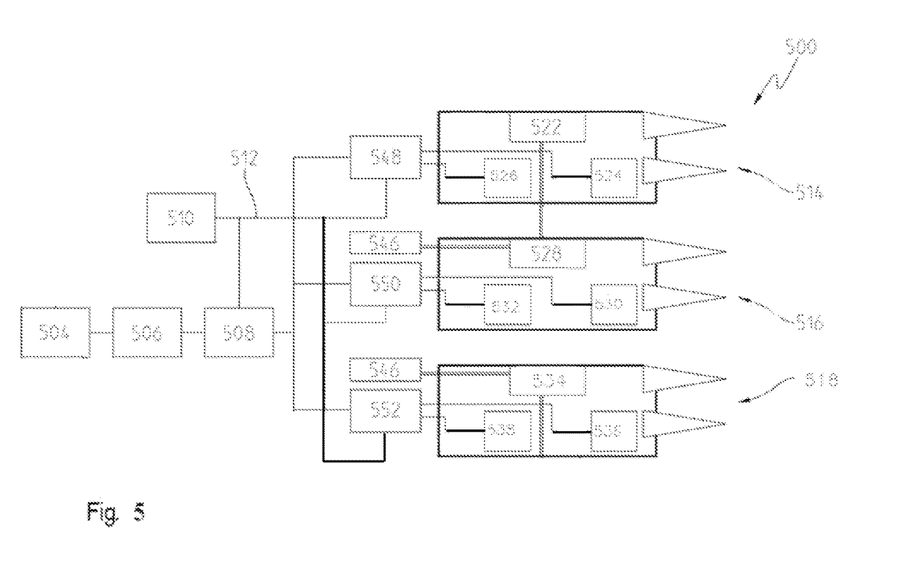
FIG. 5 is a schematic control system for controlling the independent drum drive system of FIG. 4.

Referring to FIG. 2, one of the forwardly mounted cotton harvesting units 110 is illustrated isolated from the cotton harvester 100. More specifically, a conventional cotton harvester unit 200 is illustrated. The illustrated cotton harvester unit 200 may include a plurality of picking units or row units. In FIG. 5, for example, the cotton harvester unit 200 may include four different picking units. Other machines may include a different number of picking units. In any event, each unit may include a frame 215. A drum 220 is rotatably coupled to the frame 215. In at least one picking unit, there may be a front drum 220 and a rear drum 220. A plurality of rows of spindles 225 is rotatably coupled to each drum 220. A doffer column 230 having a plurality of doffers 235 is rotatably supported by a bearing housing (not shown). The plurality of doffers 235 is positioned adjacent the spindles 225 and configured to remove cotton from the spindles 225. The bearing housing (not shown) may be threadably engaged with a fixed housing (not shown), which is coupled to the frame 215.

In the conventional system of FIG. 2, power comes from the prime mover into a gearbox and transfers via an output shaft to an idler gear stack (not shown). The power is split between the drum and spindles. A gear connects the doffers to the spindles such that a relationship between the speeds of the doffers and spindles is maintained. In this system, the doffers and spindles are rotationally driven by the same drive system. An example of this is shown in FIG. 3.

Figure 3:
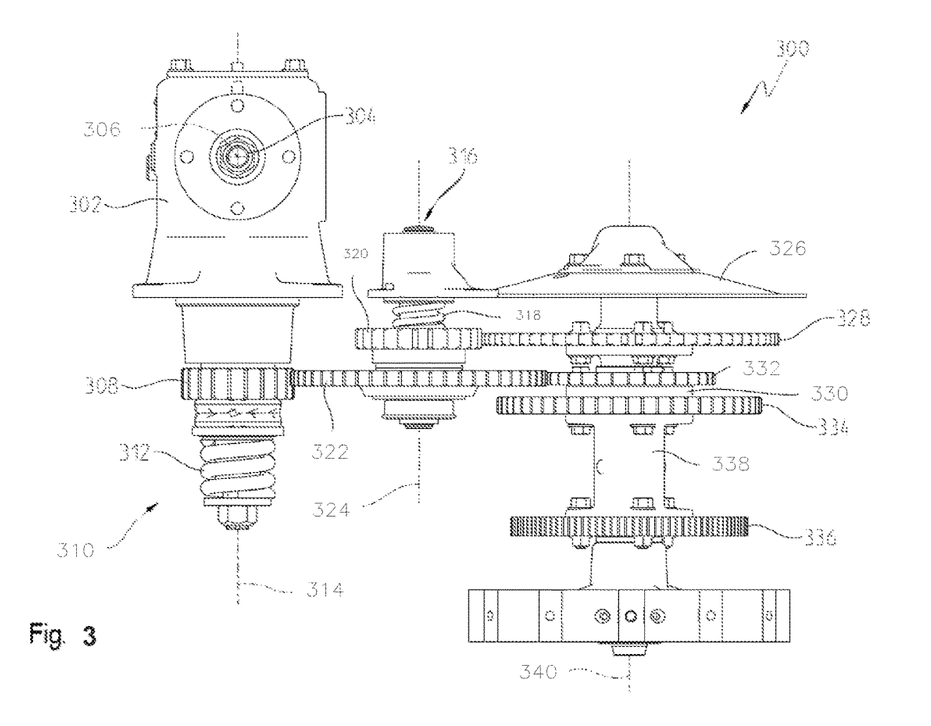
FIG. 3 is a side partial view of a conventional row unit drive system.

Referring to FIG. 3, an example of a conventional row unit drive system 300 is illustrated. In this embodiment, the system includes an outer gear casing 302 that is oriented vertically about a first vertical axis 314. A horizontal input shaft 304 is coupled to the gear casing 302 along a horizontal axis 306, and input power is delivered via the shaft 304. In one example, the horizontal shaft 304 may be driven hydraulically via a hydraulic pump and motor. Although not shown, a 90° bevel gearset may be coupled to the input shaft 304 within the gear casing 302 to transfer the power from the shaft 304 to a single input gear 308. The input gear 308 represents the single power input to the conventional picking unit. As also shown, a gear case slip clutch assembly 310 may be disposed along the vertical axis 314 and coupled to the gear case 302 in any known manner. The gear case slip clutch assembly 310 may include a spring 312 for axially moving the input gear along the axis 314 based on various torque loads.

The input gear 308 may transfer power to a gear case idler assembly. The gear case idler assembly is vertically disposed about a second vertical axis 324; it includes a drum slip clutch assembly 316. The drum slip clutch assembly 316 is spring-loaded via a spring 318 and includes a set of slip clutch jaws (not shown) located between a first drive gear 320 and a second drive gear 322. If a torque overload or plugged condition occurs, the clutch slips such that the first drive gear 320 moves axially along the second vertical axis 324 on the slip clutch jaws. This prevents damage to the various components of the row unit when the unit is plugged or a torque spike is input into the unit.

The power from the input gear 308 is split into two power flow paths at the gear case idler assembly. The first power flow path is transferred via the first drive gear 320 to a drum driven gear 328, and the second power flow path is transferred via the second drive gear 322 to an output gear 332. The drum driven gear 328 transfers power to rotatably drive the one or more drums of the row unit. The gear 328 is coupled to another gear stack along a third vertical axis 340. The drum driven gear 328 is further coupled to a portion of the row unit frame or structure 326.

The output gear 332 is also aligned axially along the third vertical axis 340. The output gear 332 is further coupled to a hub 330 and shaft 338 as shown in FIG. 3. Two additional gears are rotatably driven via the power transferred to the output gear 332, i.e., a doffer drive gear 334 and a spindle drive gear 336. Thus, all three gears rotate at the same speed. Although not shown in FIG. 3, the doffer drive gear 334 drives an idler gear, which in turn drives a doffer driven gear located on a doffer shaft. The plurality of doffers is then rotatably driven by the doffer driven gear and doffer shaft.

The spindle drive gear 336 operably drives the plurality of spindles for picking cotton. In the conventional drive system of FIG. 3, the drum drive gear 328 and spindle drive gear 336 are coupled to one another via the drum slip clutch assembly 316. In effect, the drum drive gear controls drum speed, and the spindle drive gear controls spindle speed. In this system, both drum speed and spindle speed are controlled via the same input, i.e., the input gear 308.

For purposes of this disclosure, a unit drive with controllable spindle speed to drum speed ratio may be utilized similar to that disclosed in in U.S. Pat. No. 8,006,472 ("the '472 patent") to Deere & Company, the reference of which is incorporated herein in entirety. The '472 patent discloses a selectively variable speed motor which may be hydraulic or electric and which may be infinitely variable. The ratio of the spindle rotational speed to the drum rotational speed may be adjusted over a wide range of values by varying the speed and direction of rotation of the motor. The ratio may be adjusted by a controller connected to the motor to vary motor speed in either direction of rotation. The controller is responsive to harvester ground speed and adjusts drum to spindle speed ratio and controls the drive to the main drive shaft via controller output to maintain synchronization of the drum speed to harvester speed. When the harvester is slowed and drum speed must slow to maintain synchronization of the drum with the plants entering the row receiving area, the controller will adjust the output and the speed of the motor to provide the necessary main drive shaft speed and drum speed while maintaining the spindle rotational speed at or near the speed for optimum picking efficiency. At higher row unit speeds, the controller may adjust the drum to spindle speed ratio by varying the speed of the motor and main drive shaft to prevent driving of the spindles above maximum desired rpm.

In the embodiment described in the '472 patent, doffer rotational speed may be synchronized to spindle rotational speed for efficient doffing and for prevention of doffer over-speeding. The doffer rotational speed may also be controlled to maintain doffer speed below critical, even when the row unit is operated at high speeds, by varying the ratio as described above.

Figure 4:
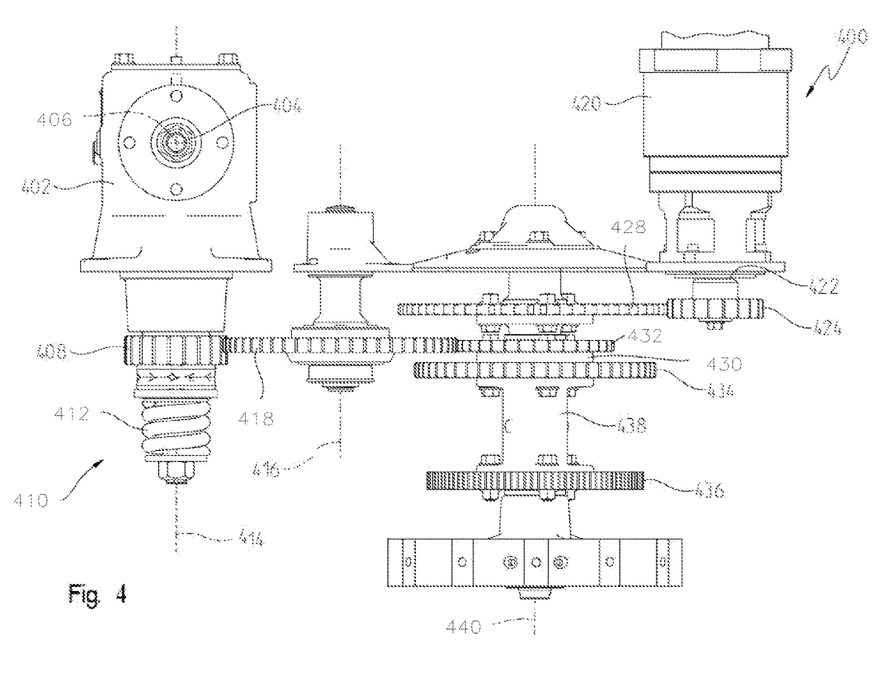
FIG. 4 is a side partial view of an independent drum drive system for a row unit.

In FIGS. 4 and 5, a different drive system for a row unit is shown. In this system 400, the aforementioned drum slip clutch assembly 316 is removed.

Referring to the embodiment of FIG. 4, a gear case 402 may be provided in which an input shaft 404 transfers power to the row unit drive system. The input shaft 404 may be horizontally oriented with respect to the gear case 402 along a horizontal axis 406. Similar to the embodiment of FIG. 3, a 90° bevel gearset located inside the gear case 402 may be coupled to the shaft 404 and transfer the power from the input shaft 404 to an input gear 408. The gear case 402 may include a gear case slip clutch assembly 410 with a spring 412. As shown, the gear case 402 and input gear 408 may be axially aligned along a first vertical axis 414.

The input gear 408 may be rotatably coupled to a drive gear 418 as shown in FIG. 4. The drive gear 418 is the only gear shown along a second vertical axis 416, and it is designed to transfer power to the spindles and doffers. As shown, the drive gear 418 is coupled to an output gear 432. The output gear 432 is rotatably coupled to a doffer drive gear 434 and a spindle drive gear 436 via a hub 430 and shaft 438. As the output gear 432 rotates, the doffer drive gear 434 and spindle drive gear 436 rotate at substantially the same speed. Moreover, each of these gears are vertically stacked or spaced relative to one another along a third vertical axis 440, as shown in FIG. 4.

Also disposed along the vertical axis 440 in FIG. 4 is a drum drive gear 428. The drum drive gear 428, however, is not rotatably driven by the input gear 408. Instead, a separate drive unit 420 is provided for driving the drum drive gear 428. In this embodiment, a hydraulic motor 420 is shown as the drive unit. As will described in further detail below, the drum drive unit may be an independent infinitely variable drive system. In any event, the drive unit is a separate input to the row unit and provides power to drive the drum independently from the spindles. In other words, unlike conventional drive systems, the first input gear 320 of FIG. 3 is removed and drum speed is independent from spindle speed in the illustrated embodiment of FIG. 4. Moreover, the row unit has two inputs, i.e., the input gear 408 and the drive unit 420.

The drive unit 420, or hydraulic motor, may include a drive shaft 422 that rotatably drives a second input gear 424. The second input gear 424 may be coupled or splined to the drum drive gear 428 in order to generate drum speed. In the embodiment of FIG. 4, the drive unit 420 operably drives the drum drive gear 428. In other embodiments, the drive unit 420 may drive two or more drums. In those embodiments, the size of the drive unit 420 may be customized to deliver the requisite amount of power to each drum.

In one example, the drive unit 420 may operably drive a front drum and a rear drum of a picking unit. In this example, the front and rear drums may be mechanically coupled to one another via a belt, chain, gearing, or other mechanical coupling device. In a second example, a single drive unit may operably drive one or more drums on two or more picking units. In this example, there may be three picking units each having a front and a rear drum. Here, three separate drive units may operably drive all six drums. Each drive unit may be directly coupled to one of the drums, and then mechanically coupled to the other. In an embodiment in which a single drive unit is operably driving two or more drums, a slip clutch or the like may be disposed on a drum drive shaft and incorporated with the drum drive gear to protect the drum drive components in case of a plug or excessive load.

In the above described embodiments in which the drum drive is separate from the spindle drive, the use of a hydraulic motor allows for independent control for different applications. Whether the application is a high or low yield, the drum speed can be synchronized with ground speed and the drums may be operably driven at a desired speed to achieve efficient picking. For example, a controller may command motor speed based on a detected ground speed of the cotton harvester row unit. Drum speed may be hydraulically controlled up to a maximum drum speed limit, and this may be achieved via a linear relationship with ground speed or controlled via a controller.

In one example, a machine operator may have a user control located within the cab of the machine to control drum speed. For instance, the operator may desire a certain maximum drum speed, and from the cab, be able to control the speed to such. In another example, the operator may be able to set a maximum drum speed at a certain ground speed. Thus, when the machine reaches a certain ground speed (e.g., 3 mph), the drum speed may be driven at their respective maximum speed. Again, this may be independent of spindle or doffer speed since the one or more drums of a given row unit are controlled by a separate drive unit (e.g., hydraulic motor).

For purposes of this disclosure, an independently controlled hydraulic drum drive system is described. In this embodiment, hydraulic pressure may be measured to detect a plugged condition or excessive load, and the pressure may be compared to a pressure threshold. With a hydraulic system, load and speed sensing may be executed by pressure and speed sensors, respectively.

Referring now to FIG. 5, a first embodiment of a control system 500 for controlling an independent drum drive system of a cotton harvester row unit is shown. The row unit may include a main drive unit such as the prime mover or engine 140. The engine 140 may be an internal combustion engine or any known type of engine capable of producing mechanical power that drives a gearbox 504, transmission unit, auxiliary drive unit, and any other sub-assemblies. The gearbox or transmission unit 504 may be a continuously variable or an infinitely variable device. Alternatively, it may be a device capable of producing various gear or speed ratios. In any event, the mechanical power from the engine 140 may be converted to hydraulic power via a hydraulic pump unit 506. Various hydraulic valves and sensors 508 may allow for selectively providing hydraulic power to a plurality of different picking units.

The control system 500 may include a controller 510 such as a head interface controller (HIC). The controller 510 may be in electrical communication with the hydraulic pump unit 506 and hydraulic valves and sensors 508 via a communication network such as a CAN bus 512. The controller 510 may communicate to or receive values from the hydraulic valves and sensors 508. In any event, hydraulic power may be supplied to the plurality of picking units as shown in FIG. 5.

In the illustrated embodiment of FIG. 5, the cotton harvester row unit may include three picking units, namely, a first picking unit 514, a second picking unit 516, and a third picking unit 518. In another embodiment, however, there may be six picking units. In a further embodiment, there may be two picking units. The present disclosure is not limited to any number of picking units, and thus the independent drum drive system may be incorporated into any number of picking units based on the teachings of the present disclosure.

Each picking unit may include a spindle and doffer drive and a front and rear drum drive. Alternatively, each picking unit may only include a single drum. As described above with reference to FIG. 4, each picking unit may include one input for driving the one or more drums and a second input for driving the spindles and doffers. In the illustrated embodiment of FIG. 5, each picking unit may include a front drum and a rear drum. In this example, a plurality of spindles may be rotatably driven by the front drum and a plurality of spindles may be rotatably driven by the rear drum. In any event, the front drum drive and rear drum drive may be independent from the spindle and doffer drive.

In FIG. 5, for example, the first picking unit 514 may include a spindle and doffer assembly 522, a front drum assembly 524, and a rear drum assembly 526. For purposes of orientation, "front" is intended to mean towards a front end of the picking unit and "rear" is intended to mean towards a rear end of the picking unit. Moreover, for purposes of this disclosure, "drum drive" may also be referred to as "drum assembly" and vice versa. The drum drive or drum assembly may include the drum and various gears (such as those shown in FIG. 4) or other structure required to drive the drum. The drum assembly is separate from the drum drive unit, which in FIG. 5 is shown as a hydraulic motor. The spindle and doffer assembly may include the different gears, hubs and shafts along with the plurality of spindles and doffers.

The second picking unit 516 may include a spindle and doffer assembly 528, a front drum assembly 530, and a rear drum assembly 532. Likewise, the third picking unit 518 may include a spindle and doffer assembly 534, a front drum assembly 536, and a rear drum assembly 538.

As in harvester row unit of FIG. 4, each spindle and doffer assembly may be mechanically driven by a variable mechanical power unit 546. The mechanical power unit 546 may be controlled by the controller 510 to provide variable spindle and doffer speeds. For instance, the engine 140 may provide mechanical power to a gear case controlled by the controller 510 which provides power to the spindle and doffer assembly. In FIG. 5, mechanical power 546 may be provided to the second spindle and doffer assembly 528, which is mechanically coupled to the first spindle and doffer assembly 522. As such, mechanical power 546 is transferred through a first flow path to the first and second spindle and doffer assemblies of the first and second picking units, respectively. Likewise, mechanical power 546 may be transferred through a second flow path to the third spindle and doffer assemblies of the third picking unit, respectively. Thus, there is a mechanical coupling between the first and second picking units and the third picking unit.

The spindle and doffer assembly may also be electrically or hydraulically driven by a motor controlled by the controller 510. For example, in the embodiment of FIG. 4, the horizontally input shaft 404 may be driven by a hydraulic or electric motor. In this example, the drive system of the spindle and doffer assembly may be controlled by the controller 510 with a closed loop, speed-controlled hydraulic pump.

In the embodiment of FIG. 5, the drum drive system is a hydraulic system in electrical communication with the controller 510 over the CAN bus 512. The controller 510 may detect or receive ground speed measurements from a speed sensor or other sensing device (not shown), and then communicate drum speed commands over the CAN bus 512 to the hydraulic system for controlling the drum speed of each drum assembly. In a further embodiment, a CAN bridge may operably couple one or more hydraulic system to the controller 510 to receive speed commands therefrom. In this manner, drum speed can be synchronized with ground speed via a linear relationship as described above. It is worth noting that while drum speed may be linearly synchronized with ground speed, the drum speed is independent of spindle speed. Thus, drum speed may be variably controlled via the controller relative to ground speed.

In the embodiment of FIG. 5, the front and rear drums of the picking units 514, 516, 518 may be hydraulically driven by a hydraulic motor. For example, in the first picking unit 514 the front drum 524 and the rear drum 526 may be hydraulically powered by a first hydraulic motor 548, in the second picking unit 516, the front drum 530 and the rear drum 532 may be hydraulically powered by a second hydraulic motor 550, and in the third picking unit 518, the front drum 536 and the rear drum 538 may be hydraulically powered by a third hydraulic motor 552. The hydraulic motors 548, 550, 552 may be in hydraulic communication with the hydraulic pump unit 506 and hydraulic valves and sensors 508. In one aspect, hydraulic lines, wires, and/or cables may couple each motor to the hydraulic pump unit 506 and hydraulic valves and sensors 508. In a different aspect, the hydraulic pump unit 506 and hydraulic valves and sensors 508 may wirelessly communicate with each motor.

Figure 6:
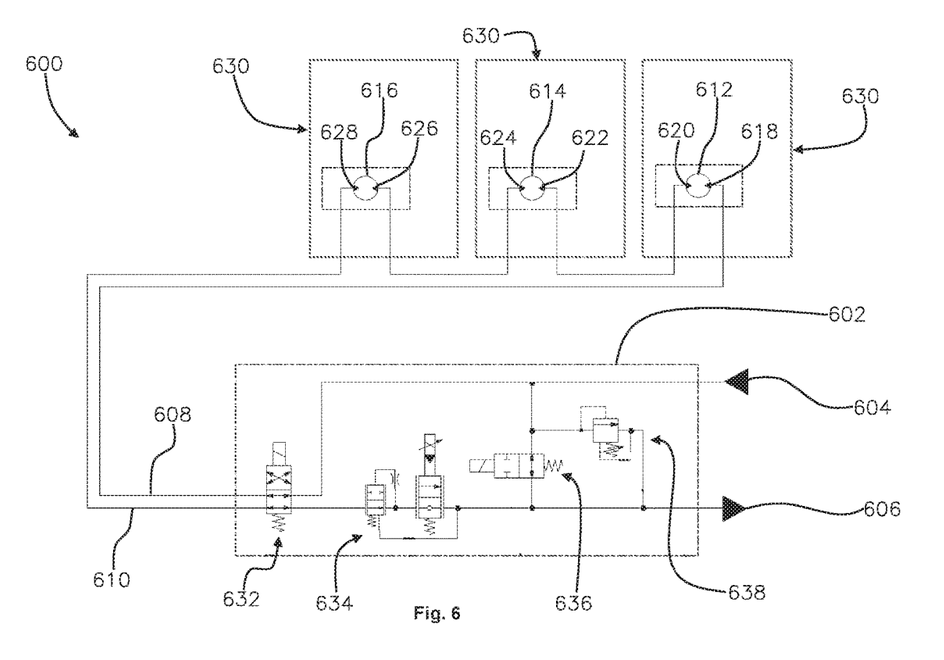
FIG. 6 is a schematic view of one embodiment of a hydraulic control manifold.

FIG. 6 shows an illustration of a hydraulic schematic 600 of the present disclosure. The hydraulic schematic 600 includes a control manifold 602 having a plurality of valves that control the flow of hydraulic fluid through the manifold 602. More specifically, the manifold 602 has a pump input 604 and an oil return line 606 that couple to a hydraulic system of the cotton harvester 100. Further, the manifold 602 may have a positive fluid routing 608 and a negative fluid routing 610. The hydraulic valves and sensors 508 described above may have one or more manifolds 602 positioned therein.

In the embodiment illustrated in FIG. 6, a first, second and third hydraulic motor 612, 614, 616 is fluidly coupled between the positive fluid routing 608 and the negative fluid routing 610 in a series configuration. More specifically, the positive fluid routing 608 is fluidly coupled to the first hydraulic motor 612 at a first orifice 618 and a second orifice 620 of the first hydraulic motor 612 is fluidly coupled to a first orifice 622 of the second hydraulic motor 614. Similarly, a second orifice 624 of the second hydraulic motor 614 may be fluidly coupled to a first orifice 626 of the third hydraulic motor 616. Then, a second orifice 628 of the third hydraulic motor 616 may be fluidly coupled to the negative fluid routing 610. In other words, the hydraulic motors 612, 614, 616 may be fluidly coupled in series to one another between the positive fluid routing 608 and the negative fluid routing 610. Accordingly, any fluid flow provided through the positive fluid routing 608 flows through each one of the hydraulic motors 612, 614, 616 before reaching the negative fluid routing 610 or vice versa.

By arranging the hydraulic motors 612, 614, 616 in series as described above and shown in FIG. 6, the hydraulic motors 612, 614, 616 may rotate at substantially the same speed and power. More specifically, the pressure and direction of hydraulic fluid flow provided through the positive fluid routing 608 and the negative fluid routing 610 of the manifold 602 may control each of the hydraulic motors 612, 614, 616 at substantially the same time. In one non-exclusive example, each of the hydraulic motors 612, 614, 616 may be coupled to a different row unit 630 to power corresponding drum assemblies as described above. In this configuration, the manifold 602 may control the speed and direction of the hydraulic motors 612, 614, 616 and thereby the corresponding drum assemblies during harvest, maintenance, cleaning or any other situation where drum rotation and speed control is needed.

In one embodiment, the pump input 604 is fluidly coupled to the hydraulic pump unit 506 of the cotton harvester 100 to provide hydraulic fluid to the pump input 604 at a system pressure. However, any external pump flow/pressure or charge source can be fluidly coupled to the pump input 604 and this disclosure is not limited to any particular one. The hydraulic pump may be a standard hydraulic pump already configured to drive other systems of the cotton harvester 100. Alternatively, the hydraulic pump may be a dedicated hydraulic pump that is specifically configured to power the manifold 602 and corresponding hydraulic motors 612, 614, 616.

In some non-limiting examples, the hydraulic pump could be a gear pump with pressure relief or flow-dumping system, a pressure compensated pump that would maintain a compensator charge pressure, a load sense pump that would maintain a margin pressure, or a closed loop hydrostatic pump that would provide flow rate and direction through the control of a swashplate angle. Similarly, the oil return line 606 may return hydraulic fluid to an existing hydraulic system of the cotton harvester 100 or to a dedicated hydraulic system. This disclosure considers many different types of hydraulic systems for powering the manifold 602 and hydraulic motors 612, 614, 616 and is not limited to one type of hydraulic system.

As described above, maintaining a desired drum speed is beneficial when harvesting cotton. Drum speeds correlate with vehicle speeds to facilitate efficiently harvesting cotton. However, during operation the drum assemblies experience many torsional forces. In, one example, the drum assemblies may need power to rotate at the proper speed to facilitate efficient harvesting of cotton. In other situations, the rotation of the spindles and doffers while interacting with the crop may accelerate the rotational speed of the drum assemblies faster than desired, thereby requiring a braking force to ensure the drum assemblies maintain ideal rotation speeds.

To maintain a desired drum speed under any potential harvesting circumstance, the manifold 602 has a plurality of valves that selectively control the drum speed via the hydraulic motors 612, 614, 616. The valves in the manifold 602 selectively provide torque or a braking force to the hydraulic motors 612, 614, 616 when needed to achieve the desired drum speed. Further still, the valves in the manifold may also provide a reversing configuration where the hydraulic motors 612, 614, 616 rotate the drum assemblies in a direction opposite of the direction they rotate during harvesting.

The manifold 602 may have a reversing valve 632, a proportional valve 634, a boost valve 636, and a relief valve 638 among others. In this non-exclusive example, the reversing valve 632 is a two-position four-way valve that allows the directing of flow in either a forward or a reverse path. More specifically, the reversing valve 632 fluidly couples each of the pump input 604 and the oil return line 606 to one of the positive fluid routing 608 or the negative fluid routing 610. Further, the reversing valve 632 has a first position and a second position. In the first position, the reversing valve 632 fluidly couples the pump input 604 to the positive fluid routing 608 and the oil return line 606 to the negative fluid routing 610. When the reversing valve 632 is in the first position, the hydraulic motors 612, 614, 616 may rotate in a harvesting direction when provided pressurized hydraulic fluid through the pump input 604.

Alternatively, when the reversing valve 632 is in the second position the pump input 604 is fluidly coupled to the negative fluid routing 610 and the oil return line 606 is fluidly coupled to the positive fluid routing 608, thereby reversing the flow of hydraulic fluid through the hyrdraulic motors 612, 614, 616. When the reversing valve 632 is in the second position, the hydraulic motors 612, 614, 616 may rotate in a reverse direction when provided pressurized hydraulic fluid through the pump input 604. The reversing valve 632 selectively rotates the drum assemblies in a forward or a reverse direction. In one aspect of the present disclosure, rotating the hydraulic motors 612, 614, 616, and in turn the corresponding drum assemblies, in the reverse direction allows a user to remove a plug in the drum assembly or execute a maintenance routine on the cotton harvester 100.

In one embodiment, the reversing valve 632 may transition between the first position and the second position via a solenoid. The reversing valve 632 may be biased towards the first position when the solenoid is not energized. In this configuration, the controller 510 selectively sends a signal to energize the solenoid to position the reversing valve 632 in the second position. In one aspect of this embodiment, the user may have a switch in the cab 108 or located somewhere else on the cotton harvester 100 that selectively energizes the solenoid of the reversing valve 632, thereby transitioning the reversing valve 632 to the second position.

In a different embodiment, the reversing valve 632 is mechanically movable between the first position and the second position by the user via a lever, knob, or other similar mechanical device. In this embodiment, the user may manipulate the lever or knob to transition the reversing valve between the first and second positions. Accordingly, this disclosure is not limited to any particular type of reversing valve.

The proportional valve 634 may be fluidly coupled to the oil return line 606 within the manifold 602. Further, in this embodiment the proportional valve 634 selectively limits the flow rate of hydraulic fluid passing through the hydraulic motors 612, 614, 616 and out the oil return line 606, thereby controlling the rotational speed of the hydraulic motors 612, 614, 616. The controller 510 may selectively control the flow rate of the proportional valve 634 to ensure the hydraulic motors 612, 614, 616 are rotating the corresponding drum assemblies at the proper speed. More specifically, in one embodiment the controller 510 receives an input for the ground speed of the cotton harvester 100 and positions the proportional valve 634 to allow a corresponding flow rate, thereby causing the drum assemblies to rotate at the desired speed relative to the ground speed. In another embodiment, the controller 510 may use look-up tables and alter the allowable flow-rate of the proportional valve 634 based on the ground speed and the look-up table. In yet another embodiment, the flow rate of the proportional valve 634 may be determined as a function of ground speed. In a different embodiment, the user may define the rotational speed of the drum assemblies via a user interface in the cab 108, and the controller 510 can adjust the proportional valve 634 to allow the proper corresponding flow rate to ensure the desired rotational speed is provided by the hydraulic motors 612, 614, 616.

In one non-limiting example, the proportional valve 634 may be a closed loop control-metering valve and a compensator valve. The metering valve provides flow control to drive the hydraulic motors 612, 614, 616, and in turn the drums coupled thereto, in a direct relationship to ground speed regardless of the state of the boost valve 636. The compensator valve up-stream of the control-metering valve provides improved flow control regardless of any change in pressure from the pump input 604.

The boost valve 636 is positioned in the manifold 602 to selectively fluidly couple the pump input 604 to the oil return line 606 to bypass the proportional valve 634. The boost valve 636 has an open or first position where the pump input 604 is fluidly coupled to the oil return line 606 while bypassing the proportional valve 634 and a closed or second position where the pump input 604 is substantially fluidly isolated from the oil return line 606 except through the proportional valve 634. The position of the boost valve 636 may be altered by the controller 510 based on the speed conditions of the cotton harvester 100 and drum assemblies. More specifically, if the controller 510 identifies that the drum assemblies are rotating at a slower speed than desired, the controller 510 may transition the boost valve 636 to the second position, thereby directing any pressurized hydraulic fluid entering from the pump input 604 to the hydraulic motors 612, 614, 616.

The boost valve 636 may operate in the open state to allow hydraulic fluid to circulate through the hydraulic motors 612, 614, 616 while the corresponding drums are powered by the interaction of the spindles to the interfering crop. While the boost valve 636 is in the open state, the hydraulic fluid can continue to circulate from the exit of the second orifice 628 of the third hydraulic motor 616 to the first orifice 618 of the first hydraulic motor 612, thereby saving external flow needs and associated power. In this condition, the hydraulic motors 612, 614, 616 are acting as brakes to keep the corresponding drums from over-speeding relative to the ground speed.

In one non-limiting example, a possible state of zero drum speed and some spindle/doffer speed may be required. Under these conditions, braking of the drums is required to hold the drums from moving. This non-limiting example could occur when the cotton harvester 100 is beginning to enter a new set of rows. More specifically, the user may desire to have some spindle motion slightly ahead of drum motion start. At slow drum speeds, in a service tether mode, or during initial startup, the hydraulic motors 612, 614, 616 require an input torque. More specifically, an input torque may be necessary to drive the drums to match a slow ground speed. To cover this condition, the boost valve 636 is shifted to the closed or second position to provide the full system pressure and flow capability of the pump input 604 to the hydraulic motors 612, 614, 616.

In one aspect of this embodiment, the controller 510 controls the boost valve 636 and the proportional valve 634 to ensure proper drum rotation speed is maintained. More specifically, if the controller 510 identifies that the drum assemblies are rotating too slow based on the ground speed, the controller 510 will transition the boost valve 636 to the second position and set the appropriate flow rate for the proportional valve 634. Then pressurized hydraulic fluid will be routed through each of the hydraulic motors 612, 614, 616 and their rotational speed will increase until the flow rate of the proportional valve 634 is achieved. Accordingly, when the boost valve 636 is in the second position a torque may be applied to the drum assemblies via the corresponding hydraulic motors 612, 614, 616.

Alternatively, the boost valve 636 remains in the first position when the controller determines the drum speeds are appropriate for the ground speed. In this configuration, the drum assemblies may be interacting with the crop, spindles, and doffers to rotate the hydraulic motors 612, 614, 616 at a speed greater than that required to maintain the desired drum speed. In this configuration, the proportional valve 634 provides a braking effect on the hydraulic motors 612, 614, 616 to ensure they do not rotate faster than desired by limiting the flow rate of hydraulic fluid through the hydraulic motors 612, 614, 616. Since the hydraulic motors 612, 614, 616 are already rotating at the desired speed, the boost valve 636 is disposed in the first position to allow the pressurized hydraulic fluid provided by the pump input 604 to bypass the hydraulic motors 612, 614, 616 and enter the oil return line 606. In other words, the boost valve 636 does not exclusively route hydraulic fluid from the pump input 604 through the hydraulic motors 612, 614, 616 when the boost valve 636 is in the first position because the hydraulic motors 612, 614, 616 are already rotating at the desired speed. Accordingly, some of the pressurized hydraulic fluid provided through the pump input 604 can be routed back into the hydraulic system through the oil return line 606 without going through the hydraulic motors 612, 614, 616.

In the embodiment shown in FIG. 6, the relief valve 638 is fluidly coupled between the pump input 604 and the oil return line 606 within the manifold 602 to provide a fluid bypass of the boost valve 636 under certain conditions. The relief valve 638 provides hydraulic system protection when the boost valve 636 is in the closed or second position during a slow or reverse speed operation. In one non-limiting example, the relief valve 638 may allow for a service tether function. The service tether function allows inspections of unit bars, broken spindles, and greasing function on the row units among other things. The drums, spindles, and doffers run at a very slow speed under the service tether function and the relief valve 638 may relieve excessive hydraulic power back to the oil return line 606 during the service tether function.

In other words, the relief valve 638 provides a pressure relief when the boost valve 636 is in the second position and the hydraulic motors 612, 614, 616 do not require all of the hydraulic power provided through the pump input 604. The hydraulic motors 612, 614, 616 may need to be powered to rotate at a slow speed. The boost valve 636 will be in the second position, routing the pressurized hydraulic fluid from the pump input 604 through the hydraulic motors 612, 614, 616. However, since the hydraulic motors 612, 614, 616 are rotating slowly, the proportional valve 634 is set to a correspondingly slow flow rate. In this configuration, the relief valve 638 may be preset to fluidly bypass the boost valve 636 to allow the unused hydraulic power to be routed back through the oil return line 606 while still providing sufficient hydraulic power to meet the required demands of the hydraulic motors 612, 614, 616.

In one embodiment of the present disclosure, each row unit may have a front and rear drum. The front and rear drums may be mechanically coupled to one another via gears, chains, belts, or the like and powered by one of the hydraulic motors 612, 614, 616. Accordingly, in the illustrative embodiment of FIG. 6, each hydraulic motor 612, 614, 616 may provide power to two drums within the corresponding row unit 630. In this configuration, a slip clutch or the like may be disposed on a drum drive shaft and incorporated with the drum drive gear to protect the drum drive components in case of a plug or excessive load.

Alternatively, as will be described in more detail with reference to FIG. 9, one or more relief valves 908, 910 may be positioned to selectively fluidly couple the first and second orifice of the corresponding hydraulic motor 612, 614, 616 when one of the drums mechanically coupled thereto becomes plugged or is otherwise prevented from rotating. In this configuration, the relief valve 908, 910 may provide a fluid bypass of the motor coupled to the plugged drum and allow sufficient hydraulic fluid flow and pressure to the remaining motors. Accordingly, the relief valves 908, 910 may take the place of mechanical clutches.

Figure 7:
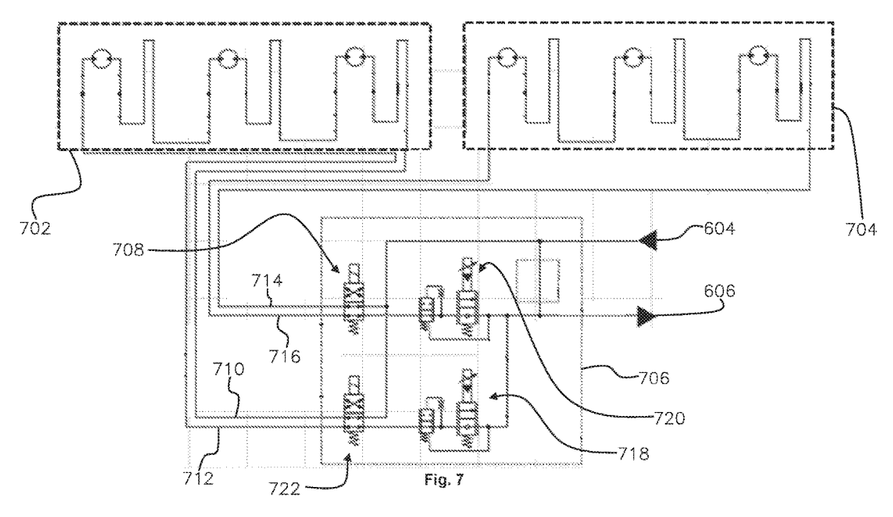
FIG. 7 is a schematic view of another embodiment of a hydraulic control manifold.

Referring now to FIG. 7, a schematic view of a hydraulic system having independent control of a first set of hydraulic motors 702 and a second set of hydraulic motors 704 is shown. The embodiment of FIG. 7 may have a hydraulic manifold 706 similar to that of the embodiment of FIG. 6 except this embodiment provides a plurality of valves that allow the first set of hydraulic motors 702 to be controlled independent of the second set of hydraulic motors 704. More specifically, the hydraulic manifold 706 may have a pump input 604 and a oil return line 606 similar to FIG. 6. The hydraulic manifold 706 may provide a first positive fluid routing 710 and a first negative fluid routing 712 for the first set of hydraulic motors 702 and a second positive fluid routing 714 and a second negative fluid routing 716 for the second set of hydraulic motors 704.

The hydraulic manifold 706 may have a first reversing valve 722 fluidly coupled to the first set of hydraulic motors 702 and a second reversing valve 708 fluidly coupled to the second set of hydraulic motors 704. The reversing valves 722, 708 may function in substantially the same way as the reversing valve 632 described above for FIG. 6. However, in the embodiment of FIG. 7, the rotational direction of the first set of hydraulic motors 702 may be controlled via the first reversing valve 722 independently of the second set of hydraulic motors 704. More specifically, the first reversing valve 722 may be in the first position, thereby rotating the first set of hydraulic motors 702 in a first direction while the second reversing valve 708 may be in a second position thereby rotating the second set of hydraulic motors 704 in a second direction or vice versa. In one embodiment, the controller 510 may determine the position of the first and second reversing valve 722, 708. In a different embodiment, a user control in the cab 108 may be manipulated by a user to alter the position of the first and second reversing valve 722, 708.

The hydraulic manifold 706 of FIG. 7 may also have a first proportional valve 718 fluidly coupled to the first set of hydraulic motors 702 and a second proportional valve 720 fluidly coupled to the second set of hydraulic motors 704.

The proportional valves 718, 720 may function in substantially the same way as the proportional valve 634 described for FIG. 6 except the first proportional valve 718 controls flow to the first set of hydraulic motors 702 and the second proportional valve 720 controls flow to the second set of hydraulic motors 704. In other words, the rotational speed of the first set of hydraulic motors 702 may be controlled independently of the rotational speed of the second set of hydraulic motors 704 via the corresponding proportional valves 718, 720.

In one aspect of this embodiment, the controller 510 may control the flow, and thereby the rotational speed, to the first set of hydraulic motors 702 and the second set of hydraulic motors 704 independently via the corresponding proportional valves 718, 720. Independently controlling the first and second set of hydraulic motors 702, 704 may provide more efficient harvesting when the cotton harvester 100 is implementing a turn operation while harvesting, among other things. More specifically, the first set of hydraulic motors 702 may rotate drums from row units on a first side of cotton harvester 100 while the second set of hydraulic motors 704 rotates drums on a second side of the cotton harvester 100. When the cotton harvester 100 is turning, the row units on the inner diameter of the turn will be processing crop at a slow rate than the row units on the outer diameter of the turn. Accordingly, the controller 510 may slow the rotational speed of the set of hydraulic motors 702, 704 on the inner diameter during the turn operation to maintain ideal drum speeds relative to the speed of the crop passing through the row units. Alternatively, or additionally, the controller 510 may accelerate the rotational speed of the set of hydraulic motors 702, 704 on the outer diameter during a turn to maintain ideal drum speeds relative to the speed of the crop passing through the corresponding row units.

While the embodiment of FIG. 7 shows three hydraulic motors in each of the first and second set of hydraulic motors 702, 704 this disclosure is not limited to such a configuration. More specifically, any number of hydraulic motors could be in the corresponding set of hydraulic motors. Further still, this disclosure is not limited to the hydraulic manifold providing fluid routings for only two sets of hydraulic motors. In another embodiment there may be three sets of hydraulic motors, each controlled independently as described herein. In yet another embodiment, each hydraulic motor powering a drum or drums of the cotton harvester may be independently controlled utilizing the teachings of this disclosure. Accordingly, the exact number and placement of hydraulic motors is meant to be representative of one of many potential embodiments using the hydraulic manifold and valve configurations shown and described herein.

Figure 8:
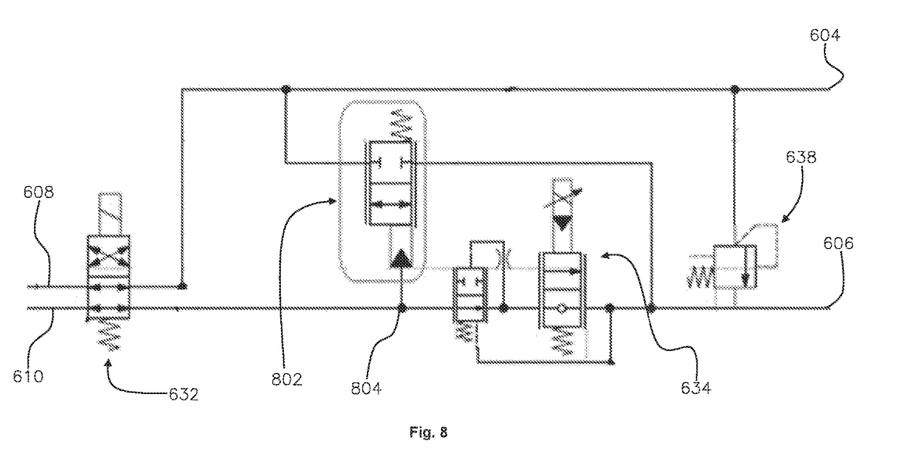
FIG. 8 is a schematic view of yet another embodiment of a hydraulic control manifold.

Referring now to FIG. 8, the manifold 602 is shown with a mechanical boost valve 802. In the embodiment of FIG. 8, the mechanical boost valve 802 may be used instead of the boost valve 636. Rather than being controlled by a solenoid, the mechanical boost valve 802 may be preset to transition between the first position and the second position based on a line pressure along an exit portion 804 of the hydraulic fluid exiting the hydraulic motors 612, 614, 616 and entering the proportional valve 634. More specifically, if the line pressure is less than an amount preset in the mechanical boost valve 802, the mechanical boost valve 802 transitions to the closed position, thereby directing hydraulic fluid to the hydraulic motors 612, 614, 616 from the pump input 604. Alternatively, when the line pressure at the exit portion 804 is greater than the preset pressure (i.e. during a braking condition of the hydraulic motors 612, 614, 616), the mechanical boost valve 802 is transitioned to the open position, thereby allowing hydraulic fluid entering from the pump input 604 to bypass the hydraulic motors 612, 614, 616 and flow to the oil return line 606.

Figure 9:
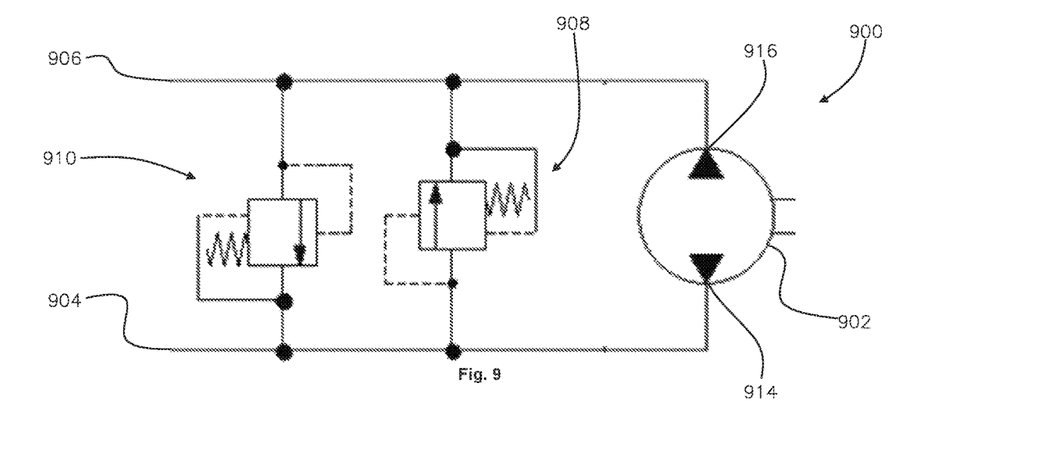
FIG. 9 is a schematic view of one embodiment of cross-port relief valves for a hydraulic motor.

FIG. 9 illustrates one non-exclusive example of a relief valve configuration 900 that allows a hydraulic motor 902 to be fluidly bypassed when a drum or other assembly coupled thereto is prevented from rotating. While only one hydraulic motor 902 is shown in FIG. 9 for exemplary purposes, this disclosure considers implementing the teachings of FIG. 9 to embodiments with multiple hydraulic motors such as those shown in FIGS. 6 and 7.

The hydraulic motor 902 may have a first fluid line 904 coupled to the motor at a first port 914 and a second fluid line 906 coupled to the motor at a second port 916 similar to those described above for FIG. 6. However, In FIG. 9 there may be a forward rotation relief valve 908 and a backward rotation relief valve 910 that can selectively fluidly couple the first fluid line 904 to the second fluid line 906. More specifically, the forward rotation relief valve 908 may be positioned between the first and second fluid lines 904, 906 to fluidly bypass the hydraulic motor 902 when the hydraulic motor 902 is rotating in the forward direction but the drum or drums coupled thereto become plugged or otherwise stop rotating. In other words, the forward rotation relief valve 908 may function in a substantially similar way as the mechanical clutches described above. The forward relief valve 908 may be preset to fluidly couple the first and second fluid lines 904, 906 when the hydraulic motor 902 is experiencing higher than usual resistance. This configuration allows any subsequent hydraulic motors fluidly coupled in series to receive adequate hydraulic fluid flow and pressure even when the preceding hydraulic motor is restricted from rotating.

Similarly, the backward rotation relief valve 910 may be positioned between the first and second fluid lines 904, 906 to fluidly bypass the hydraulic motor 902 when the hydraulic motor 902 is rotating in the backward direction but the drum or drums coupled thereto become plugged or otherwise stop rotating. In other words, the backward rotation relief valve 910 may also function in a substantially similar way as the mechanical clutches described above when the hydraulic motor 902 is rotating in the backward direction. The backward relief valve 910 may be preset to fluidly couple the first and second fluid lines 904, 906 when the hydraulic motor 902 is experiencing higher than usual resistance. This configuration also allows any subsequent hydraulic motors fluidly coupled in series to receive adequate hydraulic fluid flow and pressure even when the preceding hydraulic motor is restricted from rotating.

The forward and backward relief valves 908, 910 may have different preset pressures at which they fluidly couple the first and second fluid lines 904, 906 to bypass the hydraulic motor 902. More specifically, the hydraulic motor 902 may be executing a harvesting operation when rotating in the forward direction and only rotate in the backward direction for servicing or unplugging operations. Accordingly, the expected line pressure required to rotate the hydraulic motor 902 may be higher when rotating in the forward direction than when the hydraulic motor 902 is rotating in the backward direction. To account for the differing needs of the hydraulic motor 902, the forward relief valve 908 may be preset to fluidly couple the first and second fluid lines 904, 906 at a higher pressure than the backward relief valve 910.

The relief valves 908, 910 may be preset to any pressure value appropriate for the particular application. More specifically, the relief valve 908, 910 may be preset to pressure values that are greater than those expected under normal operating conditions. Accordingly, the relief valves 908, 910 will remain closed unless the line pressure becomes greater than the preset pressure values. Further, while the pressure relief valves 908, 910 have been described as mechanical valves that are repositionable based on a line pressure, this disclosure also considers a bypass valve between the first and second fluid lines 904, 906 that is electrically repositioned with a solenoid or the like via a controller. In this embodiment, the first and second fluid lines 904, 906 may each have a pressure sensor fluidly coupled thereto and in communication with the controller to identify the fluid pressure therein. If the fluid pressure within one of the first or second fluid lines 904, 906 becomes greater than a pressure threshold stored in the controller, the controller may actuate the solenoid of the bypass valve to fluidly couple the first and second fluid lines 904, 906.

As described herein, the hydraulic schematic 600 allows an existing pump to provide system charge pressure or flow requirement as needed regardless of whether the hydraulic motors 612, 614, 616 are providing input torque or acting as brakes. Further, the pump input 604 and oil return line 606 are fluidly coupled to an appropriate hydraulic source to keep the lines filled with hydraulic fluid regardless off the torque generated by the hydraulic motors 612, 614, 616.

Further, in the example utilizing the hydraulic pump unit 506 of the cotton harvester 100, hydraulic oil utilized by the hydraulic motors 612, 614, 616 can be cooled by the existing vehicle hydraulic cooler. More specifically, continuous braking of the hydraulic motors 612, 614, 616 may generate heat, utilizing a vehicle hydraulic cooling system may efficiently dissipate any added heat without requiring substantial modification to the cotton harvester 100.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A cotton harvester, comprising:
   a hydraulic manifold;
   at least one hydraulic motor mechanically coupled to a drum and fluidly coupled to the hydraulic manifold, the hydraulic motor configured to selectively rotate the drum; and
   at least one doffer;
   wherein, the hydraulic manifold selectively provides any one of a braking force and a torque to the drum through the at least one hydraulic motor independently from the at least one doffer.

2. The cotton harvester of claim 1, further wherein the at least one hydraulic motor comprises more than one hydraulic motor fluidly coupled to the hydraulic manifold in a series configuration.

3. The cotton harvester of claim 1, further wherein the hydraulic manifold comprises a reversing valve to selectively reverse a rotation direction of the drum with the hydraulic motor.

4. The cotton harvester of claim 1, further wherein the hydraulic manifold comprises a proportional valve to selectively control the rotational speed of the hydraulic motor both when the hydraulic motor is providing a braking force on the drum and when the hydraulic motor is providing a torque on the drum.

5. The cotton harvester of claim 1, further comprising:
   a hydraulic pump providing hydraulic fluid to the hydraulic manifold at a system pressure;
   an oil return line fluidly coupled to the hydraulic manifold to return hydraulic fluid to a source; and
   a boost valve fluidly coupled to the hydraulic manifold and having a first position and a second position;
   wherein, when the boost valve is in the first position, the boost valve provides a fluid path through the boost valve between the hydraulic pump and the oil return line;
   further wherein, when the boost valve is in the second position, the boost valve does not provide a fluid path through the boost valve between the hydraulic pump and the oil return line.

6. The cotton harvester of claim 5, wherein a controller sends a signal to the boost valve to position the boost valve in either the first position or the second position.

7. The cotton harvester of claim 5, wherein the position of the boost valve is determined mechanically based on a return line pressure.

8. The cotton harvester of claim 1, further wherein the at least one hydraulic motor comprises:
   an inlet port and an outlet port; and
   a relief valve configured to selectively fluidly couple the inlet port to the outlet port;
   wherein, the relief valve bypasses the at least one hydraulic motor by fluidly coupling the inlet port to the outlet port when a fluid pressure at one of the inlet port or the outlet port is greater than a pressure threshold.

9. A hydraulic system for a row unit on a cotton harvester, comprising:
   a pump providing a hydraulic fluid at a system pressure and having an oil return line;
   a hydraulic manifold fluidly coupled to the pump and the oil return line;
   a first hydraulic motor coupled to a first drum assembly, the first hydraulic motor fluidly coupled to the hydraulic manifold; and
   a second hydraulic motor coupled to a second drum assembly, the second hydraulic motor fluidly coupled to the hydraulic manifold;
   wherein the first and second hydraulic motors are fluidly coupled to the hydraulic manifold in series;
   further wherein, the hydraulic manifold is configured to rotate the first and second drum assemblies in a first direction and a second direction.

10. The hydraulic system of claim 9, further wherein the hydraulic manifold comprises a proportional valve that selectively alters the rotational speed of the first and second drum assembly.

11. The hydraulic system of claim 10, further wherein the proportional valve selectively varies the rotational speed of the first and second drum assembly based on a ground speed of the cotton harvester.

12. The hydraulic system of claim 9, further comprising:
    a reversing valve in the hydraulic manifold having a first position and a second position;
    wherein, when the reversing valve is in the first position, the first and second drum assembly rotate in the first direction;
    further wherein, when the reversing valve is in the second position, the first and second drum assembly rotate in the second direction.

13. The hydraulic system of claim 12, wherein a user input transitions the reversing valve between the first position and the second position.

14. The hydraulic system of claim 9, wherein the hydraulic manifold further comprises:
  a boost valve having a first position and a second position;
  wherein, when the boost valve is in the first position, the pump is fluidly coupled to the oil return line through the boost valve;
  further wherein, when the boost valve is in the second position, the pump is fluidly isolated from the oil return line through the boost valve and hydraulic fluid is routed through the first and second hydraulic motor at the system pressure.

15. A cotton harvester system, comprising:
  a cotton harvester having a prime mover and a drive system;
  a harvesting system having a first side and a second side;
  a first hydraulic manifold fluidly coupled to a first hydraulic motor, the first hydraulic motor configured to rotate a first drum positioned on the first side;
  a second hydraulic manifold fluidly coupled to a second hydraulic motor, the second hydraulic motor configured to rotate a second drum positioned on the second side;
  a first spindle assembly on the first side; and
  a second spindle assembly on the second side;
  wherein, the first hydraulic motor and the second hydraulic motor selectively rotate the corresponding first and second drums at different speeds relative to one another;
  further wherein, the first and second spindle assembly rotate independently from the first and second hydraulic motor.

16. The cotton harvester system of claim 15, further comprising:
  a first proportional valve in the first hydraulic manifold; and
  a second proportional valve in the second hydraulic manifold;
  wherein the first proportional valve is configured to alter the rotational speed of the first hydraulic motor and the second proportional valve is configured to alter the rotational speed of the second hydraulic motor.

17. The cotton harvester system of claim 15, further comprising:
  a first in-line hydraulic motor fluidly coupled to the first hydraulic manifold in series with the first hydraulic motor; and
  a second in-line hydraulic motor fluidly coupled to the second hydraulic manifold in series with the second hydraulic motor.

18. The cotton harvester system of claim 15, further wherein, the first hydraulic manifold comprises a first reversing valve configured to selectively rotate the first hydraulic motor in a first direction or a second direction;
  further wherein, the second hydraulic manifold comprises a second reversing valve configured to selectively rotate the second hydraulic motor in the first direction or the second direction;
  further wherein, the position of the first reversing valve is controlled independently of the position of the second reversing valve.

19. The cotton harvester system of claim 15, further wherein the drive system provides an input to the first and second hydraulic manifold during a turn condition;
  further wherein, the first hydraulic manifold is configured to rotate the first hydraulic motor at a different speed than the second hydraulic motor during the turn condition.

20. The cotton harvester system of claim 15, further wherein the cotton harvester further comprises a pump providing hydraulic fluid at a system pressure to each of the first and second hydraulic manifolds.

* * * * *